June 10, 1924. 1,497,329
C. N. GOODALL
DEVICE FOR COUPLING VEHICLES
Filed Jan. 28, 1920  2 Sheets-Sheet 1
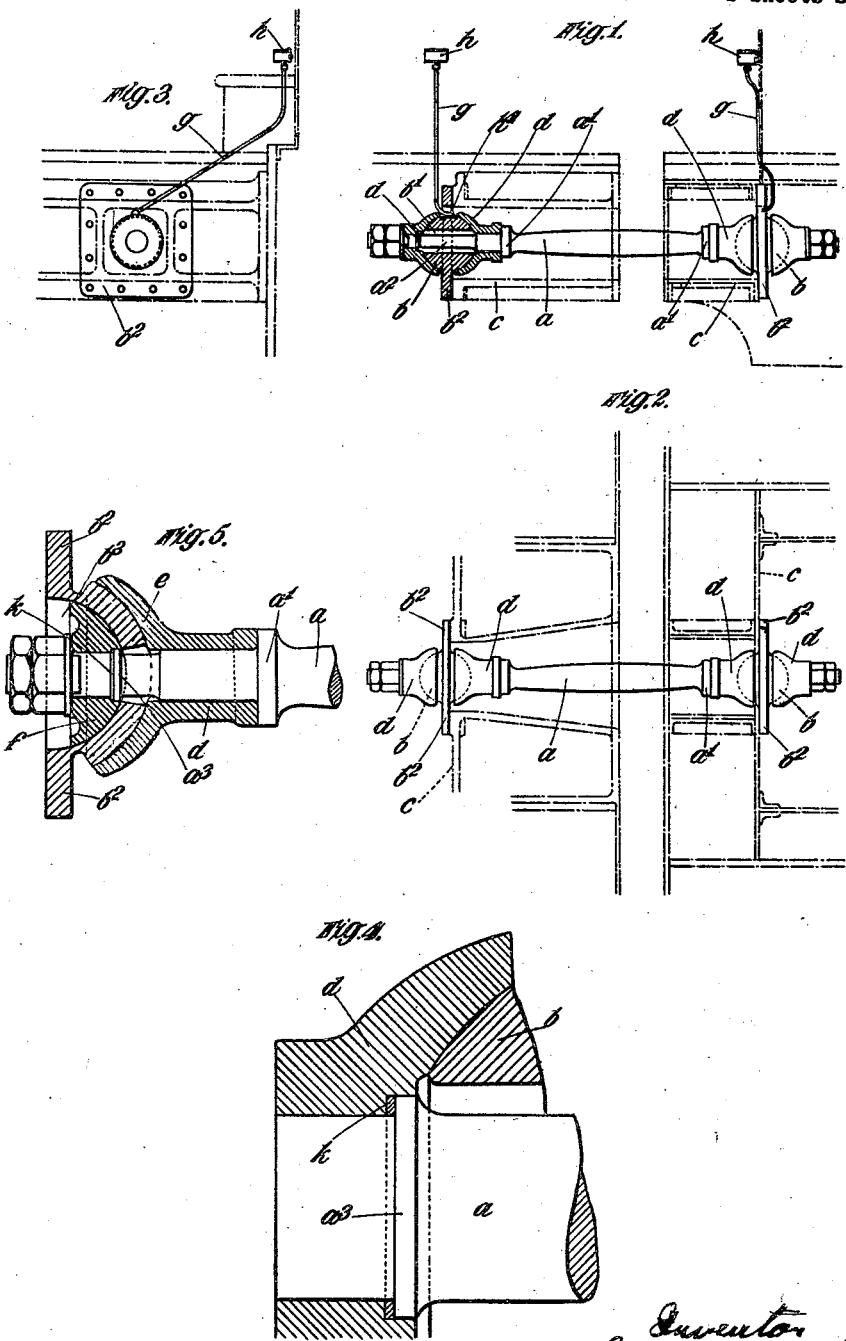

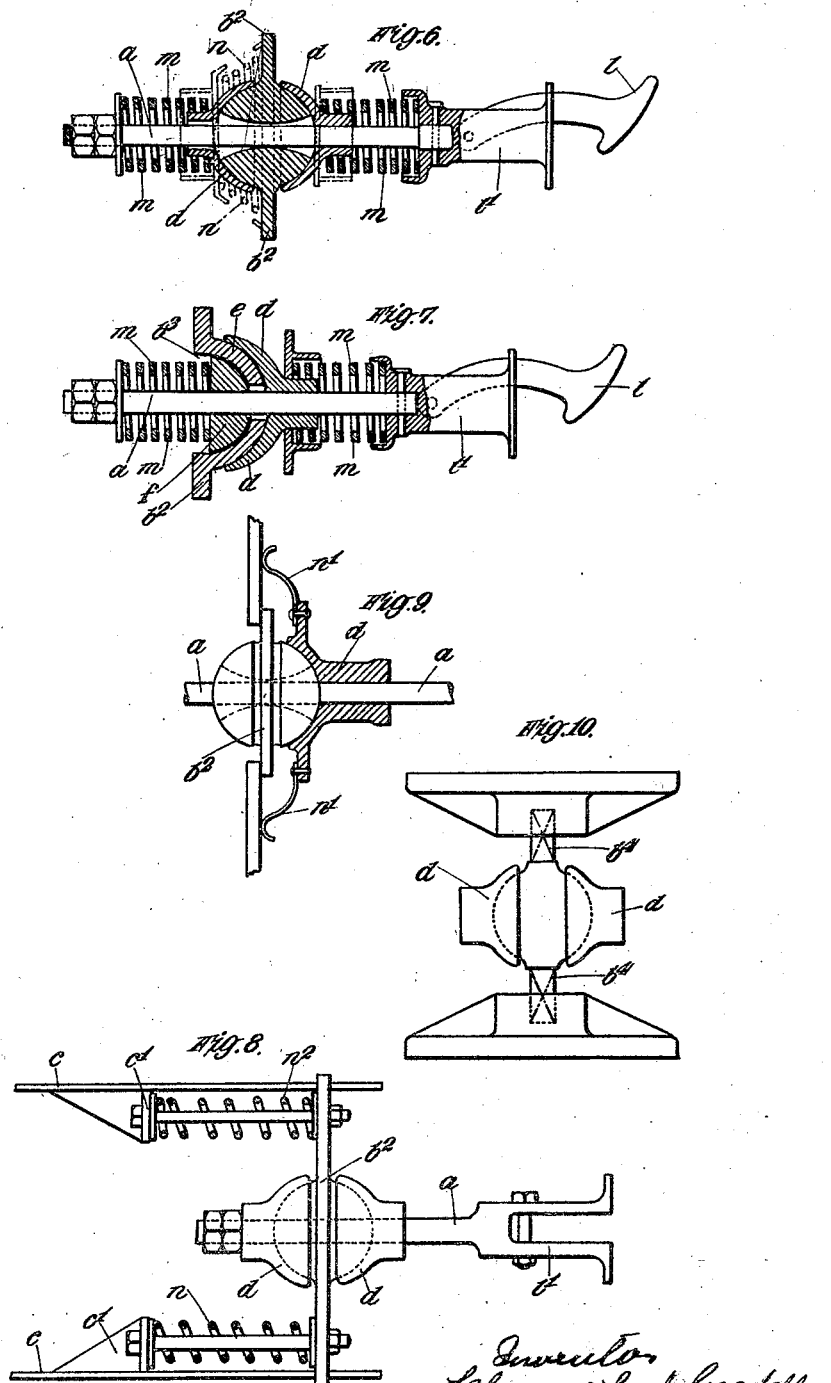

Patented June 10, 1924.

1,497,329

UNITED STATES PATENT OFFICE.

CLARENCE NOEL GOODALL, OF DARLINGTON, ENGLAND.

DEVICE FOR COUPLING VEHICLES.

Application filed January 28, 1920. Serial No. 354,612.

(GRANTED UNDER THE PROVISIONS OF THE ACT OF MARCH 3, 1921, 41 STAT L., 1313.)

*To all whom it may concern:*

Be it known that I, CLARENCE NOEL GOODALL, a subject of the King of Great Britain, residing at Darlington, in the county of Durham, England, have invented certain new and useful Improvements in or Relating to Devices for Coupling Vehicles (for which I filed an application in England October 14, 1918, Patent No. 141,396), of which the following is a specification.

This invention relates to devices of the kind comprising ball and socket joint connections for coupling vehicles, and has for its chief object to provide an improved articulated connection more particularly for coupling firmly together the under-carriage of duplex and other articulated locomotives although applicable also for connecting the engine and tender of ordinary locomotives as well as in other cases where two vehicles are required to be coupled together so as to form an articulated structure whilst preventing or limiting relative longitudinal movement of the two vehicles.

According to the invention, the means of connection comprise a centrally disposed member of spherical, hollow hemispherical or similar form adapted to be connected either directly or by means of springs to the frame or under-carriage of the vehicle, cup-like or cup and ball like members disposed co-axially on the longitudinal axis and on either side of the centrally disposed member, a means of connecting the said cup-like or cup and ball like members axially through the centrally disposed member and a draw or push bar passing through and connecting the two centrally disposed members of a pair of vehicles by means of the cup-like or ball-like members, said bar being connected to the cup-like or ball-like members either rigidly or by means of springs external to the draw or push bar.

In order that the invention may be clearly understood and readily carried into effect, the same will now be more fully described by the aid of the accompanying drawing, in which:—

Figure 1 is a longitudinal and partly sectional elevation of the draw or push bar coupling means.

Figure 2 is a plan of Figure 1.

Figure 3 is an end view of Figure 1 with parts removed.

Figure 4 is an enlarged sectional detail.

Figure 5 is a sectional detail view of a modification.

Figure 6 is a sectional elevation showing how the draw or push bar may be fitted with coupling attachment.

Figure 7 is a similar view to Figure 6 showing a modification.

Figure 8 is a detail showing one method of centralizing, an additional spring or springs being employed to maintain the draw or push bar in the horizontal position when uncoupled.

Figure 9 shows a further modification of the centralizing means.

Figure 10 is a detail showing the centrally disposed member provided with square trunnions;

Referring to Figures 1 to 3, $a$ is the draw or push bar, whilst $b$, $b$ are balls or spheres formed with an axial bore or opening $b'$ through which the ends of the bar pass. Each ball or sphere is made integral with a central flange or plate $b^2$ capable of attachment to the frame $c$, shown in broken lines.

Fitting on opposite sides of each sphere $b$, are two sleeve-like members $d$, $d$, each of cup or socket formation at one end to fit against the sphere, and the rod or link-part of the draw or push bar $a$ is furnished with collars $a'$ to abut against the outer ends of the inner sleeve members $d$ to hold them in position against the sphere, whilst the extremities $a^2$ of the rod (see Figure 1) pass through the sleeve-like members $d$ and sphere $p$ to receive appropriate securing means, such as lock nuts, for holding the parts together and for keeping the cup or concave and convex portions of the sleeve like-members $d$ against the sphere. The extremities $a^2$ of the rod are preferably journalled in the sleeve-like members $d$ and pass loosely through the sphere $b$ with sufficient clearance relatively to the latter to permit of the necessary articulation between the sleeve-like members $d$ and the spheres $b$.

In lieu of the members $b$ being in form of spheres they may be of hemispherical formation as shown at $e$, Figures 5 and 7, the outer part $f$, constituting one of the sleeve-like members, being correspondingly designed to fit within the concave recess $b^3$ of the flange $b^2$. In lieu of the sphere or hemispheres being formed with flanges $b^2$ for attachment to the underframe, said parts may be supported by trunnions $b^4$ (Figure 10) or other appropriate means. The said trunnions are shown as being of square formation, but they may, if desired, be made round and either free to revolve or fastened with a key or other suitable device. The central portion of the draw or push bar $a$ may be of any appropriate form, which will withstand sudden shocks such as buffing shocks, and may be provided with coupling devices of any desired type. Thus, Figures 6 and 7 show the improved draw or push bar fitted with coupling hooks $l$ and buffing or draw springs $m$ one on each side of the spherical or hemispherical connection, whilst an auxiliary centralizing spring $n$, see dotted lines Figure 6, may be arranged on the outer side of the flange $b^2$. In Figure 8 a modification is shown in which the centralizing is effected by means of coiled springs $n^2$ interposed between the flange $b^2$ and bracket-like supports $c'$ on the frame $c$. Figure 9 shows a further modified method of centralizing comprising auxiliary leaf springs $n'$. When the draw or push bar is provided with coupling hooks one of the sleeves $d$ may in some cases be made in one piece with the part $l'$ carrying the coupling link. For lubricating the contacting surfaces of the spheres $b$ or hemispheres $e$ and the sleeve-like members $d$, $d$ and $f$, a tube $g$, see Figures 1 and 3, may lead from an oil cup $h$ to an oil duct or channel $h^4$. Liners $k$, Figure 4, of any appropriate material may be inserted within the sleeve-like members $d$, $d$, and the member $f$, Figure 5, to take up the wear between the cup and socket members and the sphere or hemispheres, and in this connection the rod $a$ may be formed with flanges or collars $a^3$ for bearing against said liners $k$.

What I claim and desire to secure by Letters Patent of the United States is:—

1. A vehicle coupling device comprising a member having a bore therethrough lengthwise of the coupling, said member being provided with two spherically curved surfaces surrounding the axis of said bore and having integral radially projecting means adapted to be attached to a vehicle, a draw and push bar having an integral portion extending through the bore in said member, two sleeves fitted on said bar and each having at one end a surface of spherical contour conforming to and engaging the adjacent curved surface on the member adapted to be attached to the vehicle, and means for maintaining the sleeves in contact with the spherically curved surfaces on the member adapted to be attached to a vehicle.

2. A vehicle coupling device comprising a member having a bore therethrough lengthwise of the coupling, said member being provided with two spherically curved surfaces surrounding the axis of said bore and having diametrically opposite integral radial projections adapted to be attached to a vehicle, a draw and push bar having an integral portion extending through the bore in said member, two sleeves fitted on said bar and each having at one end a surface of spherical contour conforming to and engaging the adjacent curved surface on the member adapted to be attached to the vehicle, and means for maintaining the sleeves in contact with the spherically curved surfaces on the member adapted to be attached to a vehicle.

3. A vehicle coupling device comprising a member adapted to be attached to a vehicle and provided with a bore extending lengthwise of the coupling and having two spherically curved surfaces surrounding the axis of the bore, a draw and push bar having an integral portion extending through the bore in said member and provided at one side of said member with a radially projecting abutment, a sleeve on said bar with one end in contact with said abutment and its other end shaped to conform to and contact with one of the spherically curved surfaces on the member adapted to be attached to a vehicle, a second sleeve on the bar having one end shaped to conform to the other spherically curved surface on the member adapted to be attached to a vehicle, and means adjustable along the bar for maintaining contact between both said sleeves and the spherically curved surfaces on the member adapted to be attached to a vehicle.

4. A vehicle coupling device comprising a member adapted to be attached to a vehicle and provided with a bore extending lengthwise of the coupling and having two spherically curved surfaces surrounding the axis of the bore, a draw and push bar having one end extending through the bore in said member, two sleeves fitted to the bar on opposite sides of the member adapted to be attached to a vehicle and each having one end enlarged and shaped to conform to and bear against the adjacent spherically curved surface of said member, and means for effecting movement of said sleeves lengthwise of the bar and maintaining them in engagement with the spherically curved surfaces on the member adapted to be attached to a vehicle.

5. A vehicle coupling device comprising a member adapted to be attached to a vehicle and provided with a bore extending lengthwise of the coupling and having two concentric spherically curved surfaces surrounding the axis of the bore, a draw and push bar having one end extending through the bore in said member, and two sleeves fitted on said bar and each having one end shaped to conform to and contact with the adjacent spherically curved surface on the member adapted to be attached to a vehicle.

6. A vehicle coupling device comprising a member adapted to be attached to a vehicle and provided with a bore extending lengthwise of the coupling and having two concentric spherically curved surfaces surrounding the axis of the bore, a draw and push bar having a reduced end section extending through the bore in said member, an annular abutment being provided between the body of the rod and said reduced section, a sleeve surrounding the bar with one end in contact with said abutment and having its other end conforming to and bearing against the adjacent spherically curved surface on the member adapted to be attached to a vehicle, a second sleeve on the reduced section of the draw and push bar having one end conforming to and bearing against the other spherically curved surface on the member adapted to be attached to a vehicle, and means adjustable longitudinally of the reduced section of the draw and push bar and engaging the second of said sleeves for maintaining contact between the sleeves and the spherically curved surfaces on the member adapted to be attached to a vehicle.

CLARENCE NOEL GOODALL.